United States Patent Office 3,314,248
Patented Apr. 18, 1967

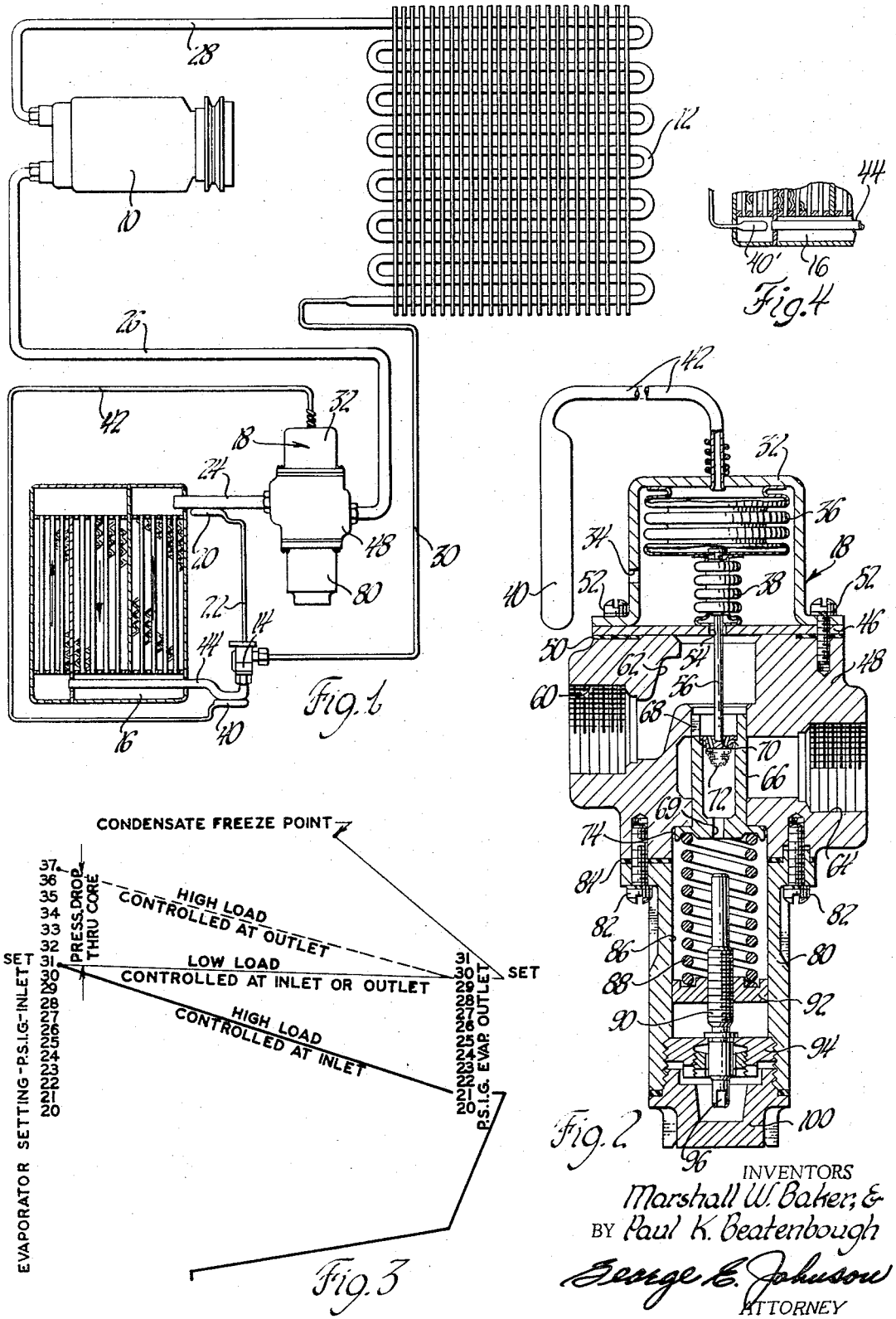

3,314,248
AIR CONDITIONING EVAPORATOR CONTROL
FOR AUTOMOBILES
Marshall W. Baker, Lockport, and Paul K. Beatenbough, Medina, N.Y., assignors to General Motors Corporation, Detroit, Mich., a corporation of Delaware
Filed Aug. 13, 1965, Ser. No. 479,408
6 Claims. (Cl. 62—217)

This invention pertains to refrigeration and more particularly to automobile air conditioning systems.

Difficulties have been experienced, in air conditioning systems as heretofore used on automobiles, in controlling the flow of refrigerant through each evaporator so that the evaporator temperature would automatically and adequately lower when the heat load was increased and, at the same time, necessary protection would be given against freezing of condensate from the atmosphere on the outside surfaces of the evaporator under all conditions of loading and compressor operation. A suitable control has become desirable which, despite a provision for a protective setting for avoiding freezing during minimum loads, would not place a limit on the performance of the evaporator or the system under maximum loads. The conditions under which an automobile air conditioning system must operate vary widely and often quickly. Engine speed, compressor speed, altitude, and ambient air temperature all change and such changes are critical as an automobile passenger compartment is not large as in a house wherein air conditioning control is relatively stable and therefore easy to accomplish. A car passenger compartment is small, the air circulation requirement is large and the many special factors involved in car use complicate the situation.

An object of the present invention is to provide an improved automobile air conditioning system in which freezing of moisture on the evaporator is prevented particularly at low refrigeration or work load on the system and at the same time, control of the evaporator temperature is effected to give maximum cooling at high refrigeration load. Another object of the present invention is to provide a control in which a substantially constant refrigerant temperature may be maintained at the evaporator inlet during high, medium or low refrigeration load operation but that, when the load on the system is increased to a high range the average evaporator refrigerant temperature is permitted to follow the critical or freezing temperature of condensate on the evaporator to a low permissible level heretofore not attainable.

A feature of the present invention is a suction control valve in a low pressure line and controlled by the evaporator inlet temperature of the refrigerant in a closed circuit including a compressor, a condenser, an expansion valve and an evaporator.

These and other important features of the invention will now be described in detail in the specification and then pointed out more particularly in the appended claims.

In the drawings:

FIGURE 1 is a schematic view of a refrigeration system in which the present invention is embodied;

FIGURE 2 is an enlarged sectional view of a suction throttling valve utilized in the system of FIGURE 1;

FIGURE 3 is a graph depicting comparative situations of evaporator operation at high and low refrigeration load on an air conditioning system; and FIGURE 4 is a modified version of a part of the system shown in FIGURE 1.

Conventional automobile air conditioning systems each employ a compressor, condenser, an expansion valve, an evaporator and an evaporator pressure control valve connected in that order to form a closed refrigerant flow circuit. Such a system, referred to only by way of example, is disclosed in the United States Patent 2,766,593 granted Oct. 16, 1956, in the names of O. Mitchell and R. V. Anderson. As in that patented system, the present invention, in general terms, employs a compressor 10, a condenser 12, an expansion valve 14, an evaporator 16 and a suction control valve 18. A temperature sensor bulb 20 detects the evaporator refrigerant discharge temperature and, by means of a line 22, controls the expansion valve 14 as is conventional. The bulb 20 is intimately in contact with a line 24 connecting the evaporator 16 to the suction throttling valve 18. The latter is connected to the compressor 10 by a line 26 and a line 28 connects the compressor 10 to the condenser 12. Flow from the latter to the expansion valve 14 is by way of a line 30. The items thus far described are, broadly speaking, and as mentioned above, as heretofore used, but the valve 18 is specifically novel in structure and function.

In practicing the present invention, it is preferable to use a multi-pass evaporator 16 with improved controls thereof forming a basic improvement over prior systems. In the present system, the suction control valve 18 has an inverted cup 32 vented at 34 and enclosing a large bellows 36 connected to a small bellows 38. The interior of the bellows 36 communicates with a bulb 40 by a line 42 and the bulb 40 is placed in close heat exchange association with the evaporator inlet or line 44 connecting the expansion valve 14 to the evaporator. The evaporator refrigerant inlet temperature could be equally well detected, for the purposes of this invention, by locating the sensor bulb at 40′ as shown in FIGURE 4.

In FIGURE 2, a plate 46 is seen as being interposed between the cup 32 and a main body 48 of the valve 18. A seal is formed between the cup and the body 48 by means of a gasket 50 and attaching bolts 52. The plate 46 is centrally apertured as at 54 freely to receive a valve spindle 56 which has its upper end attached to one end of the large bellows 36 in such a way that there is no leak between the interiors of the two bellows. The line 24 leading from the evaporator is connected to a threaded port connection 60 leading to a valve inlet chamber 62. A threaded port connection 64 connects to the line 26 whereby refrigerant may be returned to the compressor 10. A hollow sleeve valve 66, having a vertical slot 68 in its upper portion, is rigidly connected to the lower end of the rod 56 by means of an apertured plug 70. A screen 72 is provided under the plug 70. The lower end of the sleeve valve 66 is centrally apertured at 69 and has a peripheral flange 74. Vertical movement of the rod 56 with the sleeve valve 66 is such as to control the rate of flow from the chamber 62 by way of the slot 68 to the outlet connection 64 and the line 26. A cylindrical member 80 is fixed to the valve body 48 by bolts 82 with a gasket 84 interposed to prevent leakage of refrigerant from a spring chamber 86. A coil spring 88 is retained in the chamber 86 by means of a threaded post 90 and a disk 92 so that it will bear with a given load against the slidable or sleeve valve 66. A packed gland arrangement 94 serves as a bearing to mount the post 90 with the lower end of the post having opposed flats such as the flat 96 and normally enclosed by a removable cap 100.

The function of the small bellows 38 is merely to form an effective seal between the chamber 62 in the valve 18 and the atmosphere while permitting the valve sleeve 66 freely to slide. The apertures in the plug 70 together with the aperture 68 in the sleeve valve 66 causes the latter to be balanced insofar as the evaporator outlet pressure is concerned. The control position of the valve sleeve 66 is therefore determined solely by the evaporator inlet temperature and the selected loading of the spring 88.

In the operation of the system, the refrigerant is compressed at 10, liquified at 12, and released at 14 at reduced pressure into the evaporator 16 as determined by the bulb 20. Air passing through the open core passages of the evaporator 16 is passed into the passenger compartment by blower as is conventional. Ambient air carries moisture which, prior to the present invention, could condense and freeze on the exterior surfaces of the evaporator to such an extent as to disable the system in the performance of its function. When the system has a high load—i.e.— hot weather and a great demand for cooling—there is less danger of freezing on the evaporator but when the system has a light load—i.e.—not very much demand for cooling—it is desirable to keep the temperature of the evaporator above the point at which freezing will occur. The present control achieves this result without adversely affecting the system operation at high load—all of which is made clear by reference to FIGURE 3 of the drawing.

The further factors permitting operation with low refrigerant temperatures at high loads may also be described as follows:

With high loading of the evaporator surfaces, the temperature gradient between the refrigerant and air side surfaces is increased. Also, the high air velocity minimizes the accumulation of moisture between the evaporator fins or surfaces. Further, as the evaporation of refrigerant progresses in passing through the evaporator, the ratio of liquid to gas decreases to zero as the refrigerant nears the evaporator outlet with the rate of heat transfer diminishing accordingly. Thus, the tendency of the condensate to freeze at the point of lowest refrigerant pressure and temperature is minimized.

The bulb 40 and the bellows 36 contain a temperature sensitive fluid and a rise or fall in temperature of the refrigerant at the inlet to the evaporator 16 is quickly detected and translated into a control movement of the sleeve valve 66 to increase or decrease the refrigerant flow from the evaporator. If the sleeve valve 66 rises to reduce the flow, the average temperature of the evaporator 16 will rise. If the valve 66 tends to open or lower, the average evaporator temperature will lower. The loading of the spring 88 may be adjusted by turning the post 90 and with this control, refrigerant temperature at the evaporator inlet may be maintained substantially constant under all conditions—i.e.—at either low or high load.

Referring again to FIGURE 3, if the suction throttling valve 18 were controlled in accordance with the evaporator outlet temperature, the evaporator inlet and outlet temperature (37° F. inlet and 29.7° F. outlet) at high or low load would be satisfactory insofar as protection against freezing is concerned. However, as for cooling capacity at high load with such a control, the system performance suffers. As the graph shows, control from the evaporator outlet reduces the cooling effect. With the practice of the present invention, however, full capacity of the system is retained at high load when the capacity is needed—i.e.—regardless of the refrigeration load factor, control of the average evaporator temperature in accordance with the evaporator inlet temperature serves to prevent freezing and simultaneously renders available the full capacity of the system. The thermostatic expansion valve 14 represents a standard means of controlling the flow of liquid refrigerant to an evaporator. The right and left hand scales of FIGURE 3 represent refrigerant pressures. At the evaporator inlet, liquid and flash vapor from the valve 14 transmit temperature at saturated values corresponding to prevailing pressures. The extent of superheat at the evaporator outlet is a mater of choice and may be varied by presetting the valve 14. This setting is maintained regardless of outlet pressure. If the valve 14 is set for minimum superheat, the evaporator outlet temperature would be substantially saturation temperature. There is no control of evaporator outlet (refrigerant) temperature at any time either by the expansion valve 14 or by the throttling valve 18. The superheat is controlled by the setting of the valve 14 but the outlet temperature will vary as the evaporator outlet pressure changes. In FIGURE 3, the flow of refrigerant is maintained through the evaporator by the differential in pressure between the inlet at the left side of the figure and the outlet at the right side. The greater the evaporator load, the higher the refrigerant flow and pressure drop. With no superheat at the evaporator outlet, the outlet (refrigerant) temperature is lower than the inlet temperature at all times due to the refrigerant temperature following the pressure to a lower level under saturated condition. With high load controlled at the evaporator inlet and an inlet pressure of 31 p.s.i.g. and an inlet (saturtaion) of 33° the evaporator outlet temperature (no superheat) would be 20° F. The outlet temperature (8° F. superheat) would be 28° F. The pressure drop through the evaporator at high load is greater with inlet control as compared with outlet control and therefore inlet control performance is better and is preferred. The function of the valve 18 is to limit the evaporator inlet refrigerant temperature to a predetermined minimum valve by adjustment of the mechanism. Its purpose is to prevent freezing of condensate from the ambient air on the evaporator surfaces when the capacity or demand of the compressor exceeds the capacity or loading of the evaporator.

In selecting a multi-pass evaporator, the invention is utilized to maximum advantage. In such an evaporator, the pressure drop of the refrigerant in passing through the evaporator may be such as to obtain the lowest possible evaporator outlet pressure under high refrigeration load without freezing of the condensate from the ambient air. This represents a substantial reduction in average evaporator pressure and temperature as well as evaporator outlet pressure and temperature below the minimum possible when controlling to outlet pressure (28 to 30 p.s.i.g.).

If the throttling valve 18 were actuated by direct pressure of the refrigerant, the action of the valve would be difficult to control for smooth operation of the system. With temperature actuation on the other hand, the movements of the valve are dampened thereby increasing the effectiveness of the evaporator.

We claim:

1. In an automobile air conditioning system having a compressor, condenser, expansion valve, evaporator and suction control valve connected to form a closed refrigerant circuit, means for controlling said expansion valve in accordance with the temperature of refrigerant discharged from the evaporator, and means for controlling the said suction control valve in accordance with the temperature of refrigerant at the inlet to the said evaporator.

2. An automobile air conditioning system including a compressor, condenser, expansion valve, evaporator and suction control valve connected in series to form a closed refrigerant circuit, means for controlling the said expansion valve in accordance with the refrigeration demand on said system, and means for controlling the said suction control valve in accordance with the temperature of refrigerant at the inlet to the said evaporator to maintain the temperature of the evaporator surfaces above the freezing temperature at all points, while permitting a progressively lower refrigerant temperature from the evaporator inlet to the evaporator outlet, with a resultant lower average refrigerant and evaporator temperature.

3. An automobile air conditioning system having a compressor, condenser, expansion valve, evaporator and suction control valve connected to form a closed refrigerant circuit means for controlling the said expansion valve in accordance with the temperature of refrigerant discharged from the evaporator, means for controlling the said suction control valve in accordance with the temperature of refrigerant at the refrigerant inlet to the said evaporator, and said suction control valve including a valve balanced and positionally unaffected by the evaporator refrigerant discharge pressure.

4. An automobile air conditioning system as set forth in claim 3, said evaporator pressure balanced valve being adjustable in achieving a substantially constant evaporator inlet temperature.

5. In an automobile air conditioning system having a compressor, condenser, expansion valve, evaporator and suction control valve connected in series to form a closed circuit for refrigerant, thermal means for controlling said expansion valve in accordance with refrigeration load, thermal means for controlling the said suction control valve in accordance with the condition of the refrigerant at the inlet to the said evaporator, and said evaporator being of the multi-pass type to obtain a low evaporator outlet refrigerant pressure under high refrigeration load imposed upon said system.

6. In an automobile air conditioning system having a compressor, condenser, expansion valve, evaporator and suction control valve connected in series and in that order to form a closed circuit for refrigerant, thermal means for controlling said expansion valve in accordance with the refrigerant load on the evaporator, thermal means for controlling the said suction control valve in accordance with the temperature of the refrigerant at the inlet to the said evaporator, and said evaporator being of the multi-pass type permitting progressively lower refrigerant temperatures through the evaporator, with resultant lower average evaporator temperature, while simultaneously preventing the freezing of condensate moisture on the air side of the evaporator surfaces.

References Cited by the Examiner
UNITED STATES PATENTS
2,506,757   5/1950   Wilson _____ 62—217

MEYER PERLIN, *Primary Examiner.*